(12) United States Patent
Kisaichi et al.

(10) Patent No.: US 6,744,222 B2
(45) Date of Patent: Jun. 1, 2004

(54) DISCHARGE LAMP LIGHTING APPARATUS AND LAMP APPARATUS

(75) Inventors: Hiroyasu Kisaichi, Tokyo (JP); Masatomi Asayama, Yokohama (JP)

(73) Assignees: Mitsubishi Denki Kabushiki Kaisha, Tokyo (JP); Osram-Melco Limited, Yokohama (JP)

( * ) Notice: Subject to any disclaimer, the term of this patent is extended or adjusted under 35 U.S.C. 154(b) by 295 days.

(21) Appl. No.: 09/986,268

(22) Filed: Nov. 8, 2001

(65) Prior Publication Data

US 2002/0057062 A1 May 16, 2002

Related U.S. Application Data

(63) Continuation of application No. PCT/JP01/00503, filed on Jan. 26, 2001.

(30) Foreign Application Priority Data

Mar. 9, 2000 (JP) ........................................ 2000-065521

(51) Int. Cl.$^7$ .............................................. H05B 37/02
(52) U.S. Cl. ................... 315/291; 315/294; 315/307
(58) Field of Search ....................... 315/82, 83, 209 R, 315/224, 225, 226, 291, 307, 308, DIG. 5

(56) References Cited

U.S. PATENT DOCUMENTS

| | | | | |
|---|---|---|---|---|
| 5,514,935 | A | * | 5/1996 | Oda et al. ........................ 315/82 |
| 5,565,743 | A | | 10/1996 | Yamashita et al. |
| 5,936,361 | A | * | 8/1999 | Yamashita et al. ........... 315/308 |
| 6,407,515 | B1 | * | 6/2002 | Hesler et al. ................. 315/294 |
| 6,476,568 | B2 | * | 11/2002 | Urakabe et al. ............. 315/307 |

FOREIGN PATENT DOCUMENTS

| | | |
|---|---|---|
| DE | 195 31 966 | 3/1996 |
| JP | 05-258880 | 10/1993 |
| JP | 06-111989 | 4/1994 |
| JP | 06-163168 | 6/1994 |
| JP | 07-114994 | 5/1995 |
| JP | 07-211475 | 8/1995 |
| JP | 08-69888 | 3/1996 |
| JP | 09-045490 | 2/1997 |

* cited by examiner

*Primary Examiner*—James Clinger
*Assistant Examiner*—Jimmy T. Vu
(74) *Attorney, Agent, or Firm*—Burns, Doane, Swecker & Mathis, L.L.P.

(57) ABSTRACT

The discharge lamp lighting apparatus has a step-up/step-down converter 3 comprising a transformer 3a, a first switching element 3b serially connected to the transformer 3a on a side of a commercial ac power source 1, and a first diode 3c and a first capacitor 3d connected to the transformer 3a on the load side; zero-cross detection means 10 for detecting the zero-cross of voltage of the commercial ac power source 1; a supplemental power circuit 4 comprising a second diode 4a connected to the junction between the transformer 3a and the first switching element 3b, a second capacitor 4c for charging electric power stored in the coil of the transformer 3a on a side of the commercial ac power source 1 via the second diode 4a, and a second switching element 4b, a third diode 4f and an inductance 4e through which the energy charged in the second capacitor 4c is supplied to the discharge lamp 8; and a control circuit 9 that operates the second switching element 4b in the supplemental power means 4 based on the output from the voltage zero-cross detection means 10 during a predetermined period of time around the zero-cross.

20 Claims, 7 Drawing Sheets

DISCHARGE LAMP LIGHTING APPARATUS AND LAMP APPARATUS

This is a continuation of Application No. PCT/JP01/00503, filed Jan. 26, 2001.

FIELD OF THE INVENTION

This invention relates to a discharge lamp lighting apparatus that is powered by the commercial ac power source and lights up discharge lamps at high power factors.

BACKGROUND OF THE PRESENT INVENTION

FIG. 6 illustrates a circuit configuration of a prior art discharge lamp lighting apparatus disclosed in Japanese Patent Laid-Open Publication No. Hei. 9-45490. In this figure, denoted 1 is a commercial ac power source, 42 rectifier circuit, 43 step-up inverter, 44 step-down inverter, 45 rectangular wave circuit, 46 starter circuit, 8 discharge lamp, 48 step-up inverter control circuit, 49 step-down inverter control circuit, 50 rectangular wave control circuit, and 11 controlled power source circuit.

In the discharge lamp lighting apparatus of this configuration, the controlled power source circuit 11 generates controlled power when the commercial power source 1 is supplied, and then the step-up inverter control circuit 48, the step-down inverter control circuit 49 and the rectangular wave control circuit 50 initiate operation.

The step-up inverter 43 converts an output, which is made by rectifying ac voltage provided by the commercial power source 1 in the rectifier circuit 42, into a predetermined dc voltage. In this time, the step-up inverter control circuit 48 corrects the waveform distortion of the input current supplied to the step-up inverter 43 and controls the step-up inverter 43 so that the input power factor becomes almost 100%.

The step-down inverter 44 is a DC-to-DC converter that converts the dc voltage provided by the step-up inverter 43 into another dc voltage. The step-down inverter control circuit 49 controls the output voltage of the step-down inverter 44 so that the current running through the discharge lamp 8 becomes a predetermined current.

The rectangular wave circuit 45 converts the dc voltage of the step-down inverter 44 into ac voltage. The rectangular wave control circuit 50 controls the rectangular wave circuit 45 so that the current running through the discharge lamp 8 becomes a rectangular alternating current of a predetermined frequency.

The starter circuit 46 generates high voltage pulses to start up the discharge lamp 8.

FIG. 7 is a block diagram illustrating the conventional lamp lighting apparatus, called magnetic type lighting apparatus, where denoted 1 is a commercial power source, 51 capacitor, 52 choke coil, 53 high voltage pulse generator and 8 discharge lamp. The high voltage pulse generator 53 applies high voltage pulses to the discharge lamp 8. When the discharge lamp 8 lights up, a current runs from the commercial power source 1 to the discharge lamp 8. The choke coil 52 limits the current flowing to the discharge lamp 8. The capacitor 51 raises the power factor by improving the lagging in current caused by the choke coil 52.

Electric appliances are required to have high power factors in order to reduce negative effects on power system facilities for the ac commercial power. In order to raise the power factor of an electric appliance, it is necessary to convert ac voltage into dc voltage at high power factors by the use of a step-up inverter, as shown in the example of the prior art. Thus, the discharge lamp lighting apparatus becomes large and costly as such a step-up inverter is installed.

On the order hand, it is possible, as shown in FIG. 7, to control the current running through the discharge lamp by the use of a choke coil of large inductance. However, the employment of a large choke coil leads to a large lamp lighting apparatus. In addition, as shown in FIG. 8(a), since the discharge lamp current presents the same sinusoidal wave as that of the commercial ac voltage of the commercial power source, the period of time when the discharge lamp current is near zero becomes long. Then as shown in FIG. 8(b), restriking voltage appears when the discharge lamp current is low. The occurrence of restriking voltage leads to turn-off of the discharge lamp and lowers illumination efficiency.

DISCLOSURE OF THE INVENTION

It is, therefore, the object of this invention to provide an inexpensive, small, high power factor discharge lamp lighting apparatus that can reduce the generation of restriking voltage.

According to a first embodiment of the present invention, in a discharge lamp lighting apparatus for controlling electric power supplied to the discharge lamp by a step-up/step-down converter comprising a transformer, a first switching element serially connected to the transformer on a side of a commercial ac power source, a first diode and a first capacitor connected to the transformer on the load side, the discharge lamp lighting apparatus includes a zero-cross detection means for detecting the zero-cross of voltage of the commercial ac power source; a supplemental power circuit comprising a second diode connected to a junction between the transformer and the first switching element, a second capacitor for charging energy stored in the coil of the transformer on a side of the commercial ac power source via the second diode, and a second switching element, a third diode and an inductance through which the energy charged in the second capacitor is supplied to the discharge lamp; and a control circuit that calculates the voltage cycle of the commercial ac power source based on the output from the zero-cross detection means and then operates the second switching element in the supplemental power circuit at a high frequency during a predetermined period of time around the zero-cross.

As described above, the supplemental power circuit supplies electric power to the discharge lamp during the period before and after zero-cross of the commercial ac power source voltage and thus the duration of time the current running through the discharge lamp is zero becomes short. Therefore, no restriking voltage appears in the discharge lamp, turn-off of the lamp can be prevented, and decrease of the illumination efficiency can be prevented.

When the first switching device of the step-up/step-down converter is turned off, the energy stored in the leakage inductance of the transformer in the step-up/step-down converter is discharged to the second switching element in the power amplification circuit, and then a high voltage is applied to the second switching element. Thus it becomes possible to use energy efficiently and raise the conversion rate since the high voltage is stored in the capacitor via the diode and then supplied to the discharge lamp.

In addition, since the voltage applied to the switching element can be lowered, a low withstand voltage switching element can be used and the system cost is thereby reduced.

In a second embodiment of the invention, the discharge lamp lighting apparatus according to the first embodiment further includes current detection means for detecting current running through the discharge lamp; wherein the control circuit has calculation means for calculating a target current to be provided to the discharge lamp, the calculation means provides a constant target current during the period of time when the second switching element in the supplemental power circuit is operated at a high frequency and another target current of an arched waveform having peaks at around 90° and 270° of voltage of the commercial ac power source during the period of time when the second switching element is not operated, and the control circuit controls the current running through the discharge lamp detected by the current detection means so as to make it equal to the calculated target current.

As a result, since the input current presents a sinusoidal a waveform similar to that of the commercial ac power source voltage, an inexpensive system with high power factor can be provided without adding a step-up converter for improving power factor.

According to a third embodiment, in the discharge lamp lighting apparatus set forth in the second embodiment, the target current of an arched waveform having peaks at around 90° and 270° of the commercial ac power source voltage during the period of time when the second switching element in the supplemental power circuit is not operated has a waveform of squared sinusoid.

As a result, the input current supplied from the commercial power source to the discharge lamp lighting apparatus becomes very similar to the sine wave. Then the power factor is raised and the harmonic components included in the input current are reduced.

According to a fourth embodiment of the invention, in the discharge lamp lighting apparatus set forth in the first embodiment, the control circuit controls the supplemental power circuit to operate only during the period between 45° ahead and 45° behind the zero-cross of the commercial ac power source voltage or less, controls the constant target current in the target current so as to make it equal to or less than half the peak value of said target current, and operates the second switching element in the supplemental power circuit at the same frequency and for the same or shorter On-time as that for the first switching element in the step-up/step-down converter.

As a result, the current running through the supplemental power circuit is reduced to ¼ or less of the current running through the discharge lamp. Since low current capacity components can be employed in the supplemental power circuit, the circuit cost can be reduced.

Moreover, since the switching element in the supplemental power circuit is operated at the same frequency and for the same or proportional On-time as that of the switching element in the start-up/step-down converter, distortion in the input current decreases when the supplemental power circuit starts or stops operation. Then the harmonic components included in the input current are reduced.

Since the switching element in the supplemental power circuit is controlled to operate at the same frequency and for the same or proportional On-time as that for the switching element in the start-up/step-down converter, an additional control circuit that determines the duration of On-time becomes unnecessary and the system cost can be reduced.

According to a fifth embodiment of the present invention, in a discharge lamp lighting apparatus for controlling electric power supplied to the discharge lamp by a step-up/step-down converter including a transformer, a first switching element serially connected to the transformer on a side of the commercial ac power source, a first diode and a first capacitor connected to the transformer on the load side, the discharge lamp lighting apparatus includes zero-cross detection means for detecting the zero-cross of voltage of the commercial ac power source; a supplemental power circuit comprising a second capacitor installed on a side of the commercial ac power source which is charged via a second diode, a first inductance and the first switching element in the step-up/step-down converter, and supplies the energy stored in the second capacitor to the discharge lamp via a third diode, second inductance and second switching element; and a control circuit that calculates the voltage frequency of the commercial ac power source based on the output from the zero-cross detection means and then operates the second switching element in the supplemental power circuit at a high frequency during a predetermined period of time around the zero-cross.

As a result, the supplemental power circuit supplies electric power to the discharge lamp during the period before and after zero-cross of the commercial ac power source voltage and thus the duration of time when the current running through the discharge lamp is zero becomes short. Then no restriking voltage appears in the discharge lamp, turn-off of the lamp can be prevented, and decrease of the illumination efficiency can be prevented.

In addition, since the input current presents a sinusoidal waveform similar to that of the commercial ac power source voltage, it becomes possible to raise power factor without adding a step-up converter for the improvement of power factor and to provide inexpensive discharge lamp lighting systems.

According to a sixth embodiment of the invention, the discharge lamp lighting apparatus set forth in the first or fifth embodiment further includes current detection means for detecting current running through the discharge lamp; wherein the control circuit switches the second switching element in the supplemental power circuit at a high frequency over the whole cycles of the commercial ac power source voltage until said current detection means detects the current running through the discharge lamp after the discharge lamp lights up.

As a result, when the discharge lamp starts dielectric breakdown triggered by high voltage pulses and initiates discharge, the supplemental power circuit also supplies current to the discharge lamp. Therefore, a sufficient amount of current is provided during the transition from the unstable discharge state immediately after the dielectric breakdown to stable light-up, and then a smooth start-up is realized.

According to a seventh embodiment of the invention, the discharge lamp lighting apparatus set forth in the first or fifth embodiment further includes a voltage detection means for detecting the voltage of the commercial ac power source; wherein the second switching element in the supplemental power circuit is switched at a high frequency when the commercial ac power source voltage is determined to be lower than normal voltage.

As a result, even if voltage falls or power supply to the discharge lamp fails due to a trouble in the commercial ac power source, electric power can be supplied by the supplemental power circuit to the discharge lamp and then the probability of turn-off of the lamp can be lowered even when a trouble arises in the commercial ac power source.

According to an eight embodiment of the present invention, in a discharge lamp lighting apparatus for controlling electric power supplied to the discharge lamp by a step-up/step-down converter including a transformer, a first switching element serially connected to the transformer on a side of the commercial ac power source, a first diode and a first capacitor connected to the transformer on the load side, the discharge lamp lighting apparatus includes: zero-cross detection means for detecting the zero-cross of voltage of the commercial ac power source; a supplemental power circuit comprising a second diode connected to the junction between the transformer and the first switching element, a second capacitor for charging energy stored in the coil of the transformer on a side of the commercial ac power source via the second diode, and a second switching element, a third diode and an inductance through which the energy stored in the second capacitor is supplied to the discharge lamp; and a control circuit that operates the second switching element in said supplemental power circuit at the same frequency as that for the first switching element in said step-up/step-down converter during an On-time shorter by a predetermined time than the On-time of said first switching element, over the whole cycles of the commercial ac power source.

As a result, even when large current cannot be taken out from the commercial ac power source during the period around the zero-cross of the commercial ac power source voltage, a sufficient current is supplied to the discharge lamp via the second capacitor and the second switching element and the period of time when the current running through the discharge lamp is zero becomes short. Therefore, no restriking voltage appears in the discharge lamp, turn-off of the lamp can be prevented, and the illumination efficiency does not decrease.

When the first switching element in the step-up/step-down converter is turned off, the energy stored in the leakage inductance of the transformer in the step-up/step-down converter is discharged as a surge voltage to the second switching element in the power amplification circuit. This energy is converted into a switching loss in general. However, since this energy is stored in the capacitor via the second diode and then supplied to the discharge lamp in this embodiment, the energy can be used efficiently and the conversion rate can be increased.

Further, the surge voltage generated at the first switching element is thereby absorbed in the capacitor via the second diode, so that low withstand voltage switching elements can be used and the system cost is thereby reduced.

Since the second switching element is operated at the same frequency as that of the first switching element during an On-time shorter by a predetermined time than that of the first switching element over the whole cycles of the commercial ac power source, it becomes possible to supply current to the discharge lamp via the second capacitor and the second switching element to prevent turn-off of the discharge lamp, even if the commercial ac power source momentarily fails due to a trouble.

According to a ninth embodiment of the invention, the discharge lamp lighting apparatus set forth in the eight embodiment further includes current detection means for detecting current running through the discharge lamp; wherein the control circuit has calculation means for calculating a target current to be provided to the discharge lamp, makes a target current of an arched waveform having peaks at around 90° and 270° of the commercial ac power source voltage almost flat around the zero-cross, and controls the discharge lamp current detected by said current detection means so as to make it equal to the calculated target current.

As a result, since the input current presents a sinusoidal waveform similar to that of the commercial ac power source voltage, it becomes possible to raise power factor without adding a step-up converter for the improvement of power factor and to provide inexpensive discharge lamp lighting systems.

The apparatuses described in these first to ninth embodiments of the present invention light up discharge lamps, synchronizing with the commercial ac power source. Thus they are particularly suitable for use in high voltage type discharge lamps such as metal halide lamps, which are more likely to become unstable in discharge operation upon high frequency start-up than fluorescent lamps.

BEST MODE FOR CARRYING OUT THE INVENTION

Embodiment 1

Figure 1:
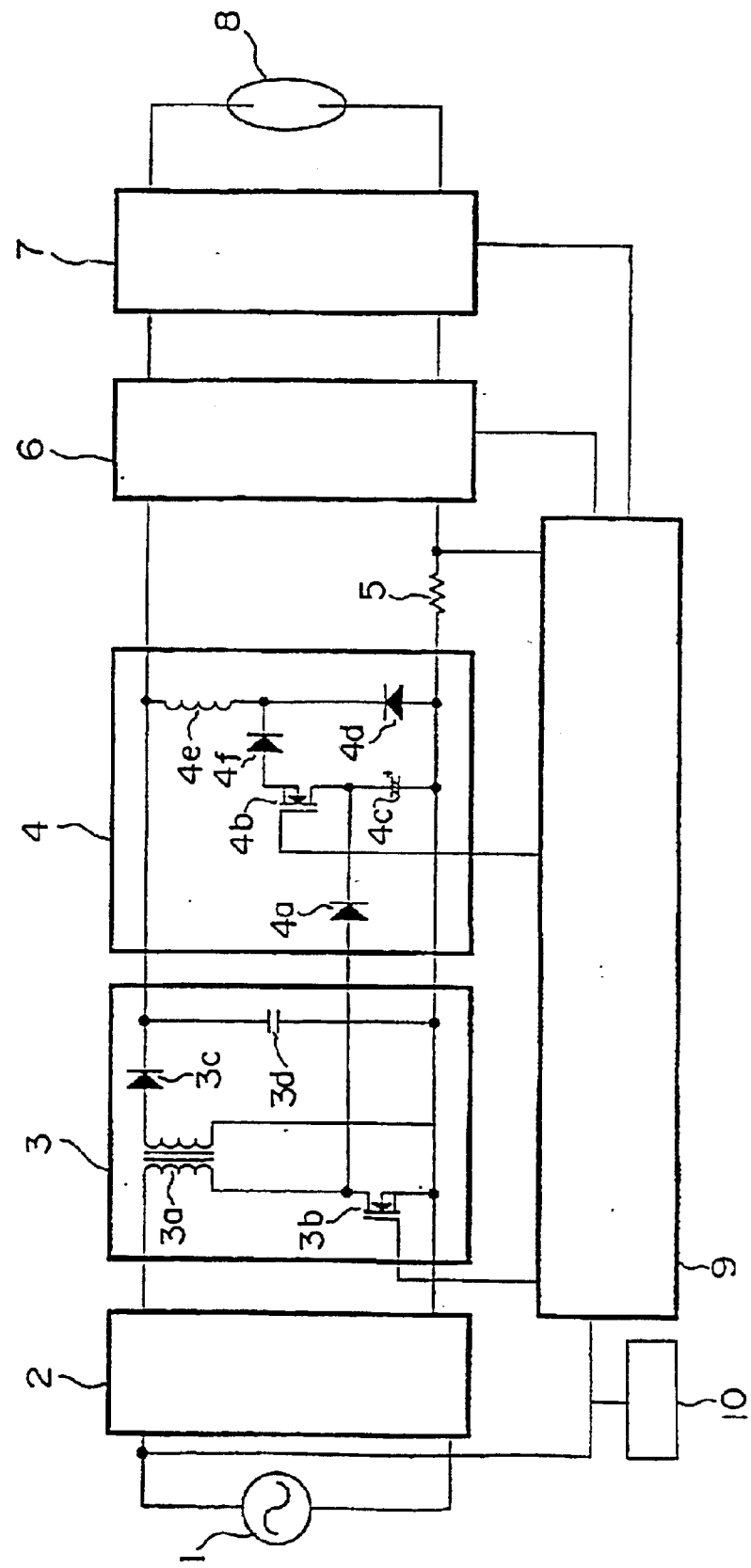
FIG. 1 is a block diagram illustrating a discharge lamp lighting apparatus according to first to fourth and eighth embodiments of the present invention.
Figure 2:
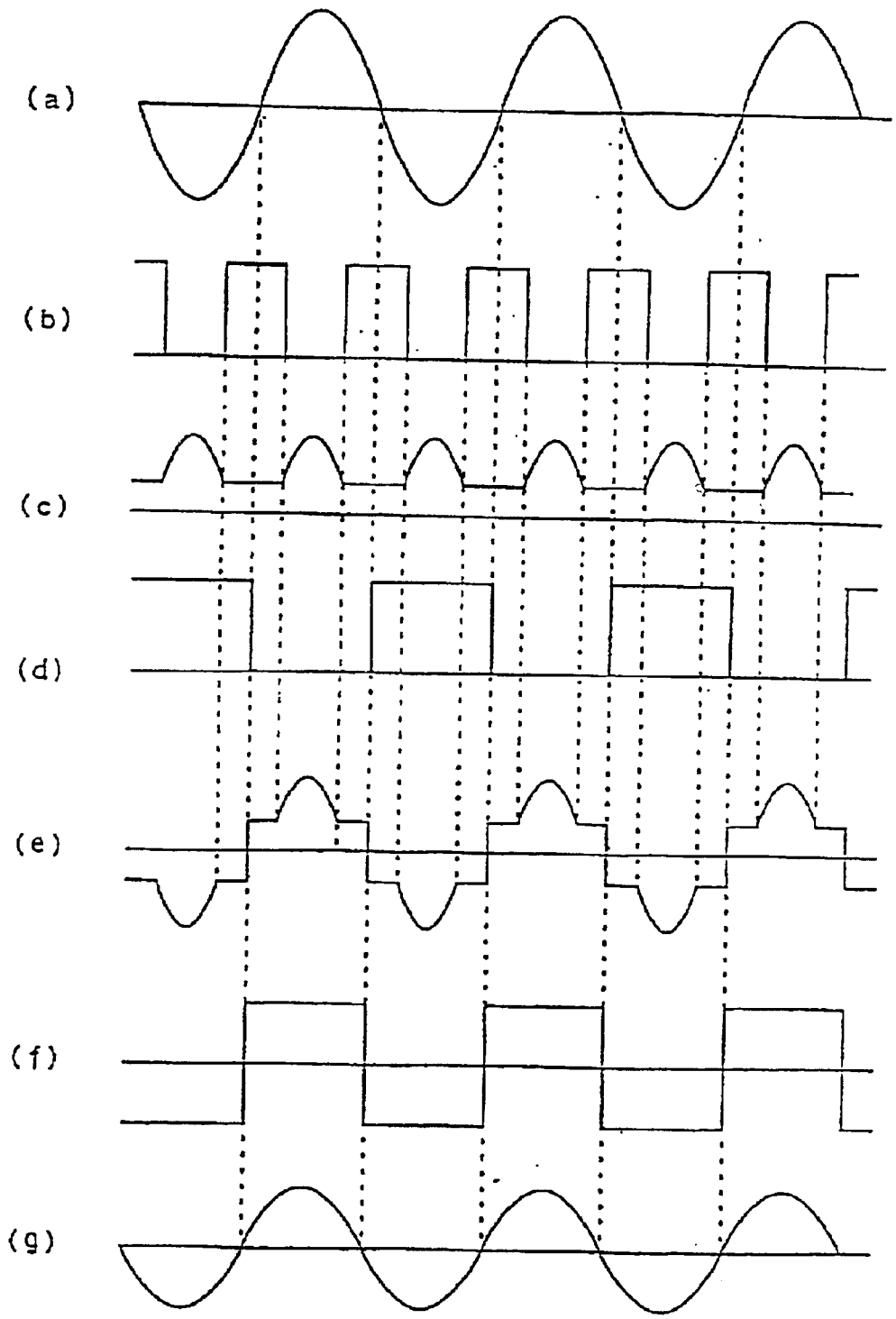
FIG. 2 is a diagram illustrating operation waves in the first embodiment.

FIG. 1 is a block diagram illustrating a discharge lamp lighting apparatus according to a first embodiment of the invention, and FIG. 2 is a diagram illustrating its operation waveforms. In FIG. 1, denoted 1 is the commercial ac power source, 2 diode bridge for the full-wave rectification of the commercial ac power, and 3 step-up/step-down converter for stepping up an stepping down the full-wave rectified voltage, composed of a transformer 3a, first switching element 3b, first diode 3c and first capacitor 3d. Denoted 4 is a supplemental power circuit composed of a second diode 4a, third diode 4f, diode 4d, second switching element 4b, second capacitor 4c and inductance 4e.

Denoted 8 is a discharge lamp, 5 current detection resistance as current detection means for detecting the current running through the discharge lamp 8, 6 polarity switching circuit for switching the polarity of current running through the discharge lamp 8, 7 starter pulse generating circuit for generating high voltage pulses to start up the discharge lamp 8, 9 control circuit and 10 zero-cross detection means for detecting the zero-cross of voltage of the commercial ac power source 1.

Referring now to FIG. 1, the operation thereof is described below. When a commercial ac power source is supplied, the control circuit 9 starts to work. The control circuit 9 activates the starter pulse generating circuit 7 and lights up the discharge lamp 8 by applying high voltage pulses to the discharge lamp 8. Using calculation means (not shown), the control means 9 calculates in advance a target current to be provided to the discharge lamp 8.

When the discharge lamp 8 lights up, a current runs through the current detection resistance 5. The control circuit 9 reads this current and controls the step-up/step-down converter 3 with feedback so that the detected current becomes equal to the target current calculated by the calculation means of the control circuit 9.

The first switching element 3b in the step-up/step-down converter 3 repeats On/Off operations at a high frequency of several tens kHz. When the first switching element 3b is ON, a current runs through the transformer 3a on the primary side and energy is stored in the transformer 3a. When the first switching element 3b turns off, the stored energy is discharged as electric power to the secondary side of the transformer 3b. Since the discharged electric power has a high frequency of several tens kHz, the included harmonic components are removed by the first diode 3c and the first capacitor 3d, and then the electric power is supplied to the discharge lamp 8 via the polarity switching circuit 6.

If the duration of time when the first switching element 3b is turned on is prolonged, the energy stored in the transformer 3a increases and the output power to the secondary side also increases. The control circuit 9 prolongs the On-time duration of the first switching element 3b and increases the current provided to the discharge lamp 8 if the detected current is lower than the target current. While the detected current is higher than the target current, the On-time of the first switching element 3b is shortened and the current provided to the discharge lamp 8 is also reduced. The current running through the discharge lamp 8 is so controlled as to match with the target current by performing such operations at high speed.

The control circuit 9 controls the polarity switching circuit 6, synchronizing with the zero-cross of the commercial ac power source detected by the zero-cross detection means 10. As a result, an ac current synchronizing with the commercial ac power source runs through the discharge lamp 8.

In the supplemental power circuit 4, electric energy is stored in the transformer 3a during the time when the first switching element 3b in the step-up/step-down converter 3 is turned on, while the stored energy is discharged as electric power to the secondary side of the transformer 3a when the first switching element 3b is turned off. At the same time, electric energy is also stored in the second capacitor 4c via the second diode 4a in the supplemental power circuit 4.

Using the calculation means, the control circuit 9 calculates the frequency of voltage of the commercial ac power source based on the zero-cross of the commercial ac power source voltage detected by the zero-cross detection means 10. Based on the calculated frequency, during a period from a predetermined time before the zero-cross to a predetermined time after the zero-cross, the control circuit 9 switches the switching device 4b of the supplemental power circuit 4 at a high frequency and supplies the energy stored in the second capacitor 4c to the discharge lamp 8 via the third diode 4f, inductance 4e and polarity switching circuit 6.

The diode 4d is a regenerating diode that discharges energy stored in the inductance 4e toward the discharge lamp when the second switching element 4b turns off during the high frequency On/Off operation of the second switching element 4b.

The operation of the supplemental power circuit 4 is further described, referring to FIG. 2.

FIG. 2(a) illustrates the voltage waveform of the commercial ac power source, FIG. 2(b) the waveform of the second switching element 4b during its operation, FIG. 2(d) the target current waveform, FIG. 2(c) the waveform of polarity switching, FIG. 2(e) the waveform of current running through the discharge lamp 8, FIG. 2(f) the waveform of the discharge lamp voltage, and FIG. 2(g) the waveform of the input current provided to the discharge lamp lighting apparatus.

First, the voltage of the waveform shown in FIG. 2(a) is supplied from the commercial ac power source and the second switching element 4b conducts switching operation at a high frequency during a period between the predetermined times before and after the zero-cross, as shown in FIG. 2(b). On the other hand, the calculation means of the control circuit 9 calculates the target current shown in FIG. 2(c). The target current is set at a direct current during the time when the second switching element 4b is operating at a high frequency, while the target current is set at an arched current having peaks at 90° and 270° of the waveform of the commercial ac power source voltage.

The control circuit 9 reads the current running through the current detection resistance 5 and controls the step-up/step-down converter 3 and supplemental power circuit 4 with feedback so that the detected current becomes equal to the target current calculated by the calculation means of the control circuit 9. The output of the step-up/step-down converter 3 and the supplemental power circuit 4 is modified in accordance with the polarity switching wave as shown in FIG. 2(d), provided by the polarity switching circuit 6, synchronizing with the voltage zero-cross of the commercial ac power source 1. This output current provided to the discharge lamp 8 presents the waveform shown in FIG. 2(e). The duration time when the discharge lamp current is near zero becomes short because the supplemental power circuit 4 supplies electric power to the discharge lamp 8 before and after zero-cross as shown in FIG. 2(e). As a result, the discharge lamp voltage presents the voltage waveform shown in FIG. 2(f) that does not cause restriking voltage.

During the operation of the supplemental power circuit 4, the dc voltage source of the second capacitor 4c supplies electric power to the discharge lamp 8 and at this time the target current is a direct current. Consequently, the control circuit 9 drives the first switching element 3b during a fixed On-time and the input current flowing from the commercial ac power source to the lighting apparatus presents a sinusoid waveform similar to the voltage waveform of the commercial ac power source during the operation of the supplemental power circuit 4. While the supplemental power circuit 4 is not working, the target current presents an arched waveform having peaks at 90° and 270° the voltage waveform (or voltage cycle) of the commercial ac power source. Then the input current also presents an arched waveform having peaks at 90° and 270° of the commercial ac power source voltage. As a result, the input current presents a sinusoidal waveform similar to the voltage waveform of the commercial ac power source, as shown in FIG. 2(g).

As evident from the waveform of the current running through the discharge lamp shown in FIG. 2(e) and the waveform of the voltage applied to the discharge lamp shown in FIG. 2(f), the voltage of the discharge lamp is kept constant regardless of the current of the discharge lamp. Now suppose that the discharge lamp voltage is a predetermined constant value, A, and the voltage of the commercial ac power source is given by $V° \sin \theta$. If the current flowing from the commercial ac power source to the discharge lamp lighting apparatus has to have a waveform of $I° \sin \theta$ synchronizing with the voltage of the commercial ac power source, the discharge lamp current should take a waveform expressed by a square of $\sin \theta$, as derived from the equation:

$$V° \sin \theta \times I° \sin \theta = A \times \text{Discharge lamp current}.$$

Then the power factor improves, because the input current has a waveform of $\sin \theta$ synchronizing with the commercial ac power source voltage. The waveform of square sin θ is similar to that shown in FIG. 2(g).

As described above, the supplemental power circuit 4 supplies electric power to the discharge lamp 8 during the period before and after zero-cross of voltage of the commercial ac power source 1 and thus the duration of time when the current running through the discharge lamp 8 is zero becomes short. Then no restriking voltage of the discharge lamp 8 appears, turn-off of the lamp can be prevented, and decrease of the illumination efficiency can be prevented.

When the first switching element 3b of the step-up/step-down converter 3 is turned off, the energy stored in the leakage inductance of the transformer 3a of the step-up/step-down converter 3 is discharged to the supplemental power circuit 4, and then a high voltage is applied to the second switching element 4b. In most cases, a snubber circuit composed of capacitors and resistors is employed to convert this high voltage into heat for exhaustion. In the present embodiment, it is possible to use energy efficiently and raise the conversion rate since the high voltage is stored in the second capacitor 4c via the second diode 4a and then supplied to the discharge lamp 8.

In addition, since the voltage applied to the second switching element 4b can be lowered, low withstand voltage switching elements can be employed and the system cost is thereby reduced.

When the supplemental power circuit 4 is operating during the period before and after the zero-cross of the commercial ac power source voltage, the commercial ac power source supplies little of power to the discharge lamp 8 because of the low voltage of the source and the second capacitor 4c of the supplemental power circuit 4 supplies most of power. The target current supplied to the discharge lamp 8 during this period is set at the flat portion of the waveform shown in FIG. 2(c). That is, the target current is a constant current during this period. Since the main power source to supply power to the discharge lamp 8 is the direct current from the capacitor 4c, the current supplied to the discharge lamp 8 is made constant by making the control circuit 9 to drive the second switching element 4b during a fixed On-time. If the first switching element 3b is also driven during the fixed On-time, the current flowing from the commercial ac power source 1 to the lighting apparatus presents a sinusoidal waveform similar to the waveform of the commercial ac power source voltage. While the supplemental power circuit 4 is not working, the target current presents an arched waveform having peaks at 90° and 270° of the commercial ac power source voltage. As a result, the input current presents a sinusoidal waveform similar to that of the commercial ac power source voltage, and it becomes possible to raise power factor without adding a step-up converter for the improvement of power factor.

Besides, while the second switching element 4b in the supplemental power circuit 4 is not working, the target current presents an arched waveform expressed by squared sinusoid having peaks at around 90° and 270° of the commercial ac power source voltage and a waveform. Therefore, the input current supplied from the commercial ac power source 1 to the discharge lamp lighting apparatus becomes very similar to the sine wave. Then the power factor is raised, and the harmonic components included in the input current are reduced.

Embodiment 2

Since the block diagram of the discharge lamp lighting apparatus according to the second embodiment of the invention is the same as that of the first embodiment, the second embodiment is explained with reference to FIG. 1.

In FIG. 1, the operation period of the supplemental power circuit 4 is limited to a period between 45° ahead and 45° behind the zero-cross of the commercial ac power source 1 or less, namely a half cycle of the commercial ac power source or less. Besides, the value of the target current is set at a half of the peak value of the target current or less.

In addition, the switching element 4b in the supplemental power circuit 4 is controlled so that it operates at the same frequency and for the same On-time or a few $\mu$sec shorter On-time as that of the first switching element 3b in the startup/step-down converter 3.

Since the operation period of the supplemental power circuit 4 is limited to the period between 45° ahead and 45° behind the zero-cross of the commercial ac power source 1 or less, namely a half cycle of the commercial ac power source or less, and the value of the target current is set at a half of the peak value of the target current or lower, the current running through the supplemental power circuit is reduced to ¼ or less of the current running through the discharge lamp. As a result, low current capacity components can be used in the supplemental power circuit and the circuit cost is thus reduced.

Moreover, since the switching element 4b in the supplemental power circuit 4 is controlled to operate at the same frequency as that of the first switching element 3b in the start-up/step-down converter 3 for the same or proportional On-time, distortion in the input current decreases which appears when the supplemental power circuit 4 starts or stops operation. Then the harmonic components included in the input current are reduced and the system cost can be reduced because no control circuit needs to be added for the determination of On-time.

Embodiment 3

Since the block diagram of the discharge lamp lighting apparatus according to the third embodiment of the invention is the same as that of the first embodiment shown in FIG. 1, the third embodiment is explained with reference to FIG. 1.

The second switching element 4b in the supplemental power circuit 4 is switched at a high frequency over whole cycle of the commercial ac power source, until the starter pulse generating circuit 7 applies high voltage pulses to the discharge lamp 8 for lighting up and the current running through the discharge lamp 8 is detected by the current detection resistance 5.

When the discharge lamp starts dielectric breakdown triggered by high voltage pulses and initiates discharge, the supplemental power circuit also supplies current to the discharge lamp. Therefore, a sufficient amount of current is provided during the transition from the unstable discharging state immediately after the dielectric breakdown to stable light-up, and then a smooth start-up is realized.

Embodiment 4

Since the block diagram of the discharge lamp lighting apparatus according to the fourth embodiment of the invention is the same as that of the first embodiment shown in FIG. 1, the fourth embodiment is explained with reference to FIG. 1.

The voltage detection means installed in the control circuit 9 detects the commercial ac power source voltage. If a decrease from the normal voltage is detected in the commercial ac power source voltage, the second switching element 4b in the supplemental power circuit 4 is switched at a high frequency even when it is out of the predetermined time before and after the zero-cross of the commercial ac power source voltage.

Therefore, even if a trouble arises in the commercial ac power source, the probability of turn-off of the lamp can be lowered.

Embodiment 5

Figure 3:
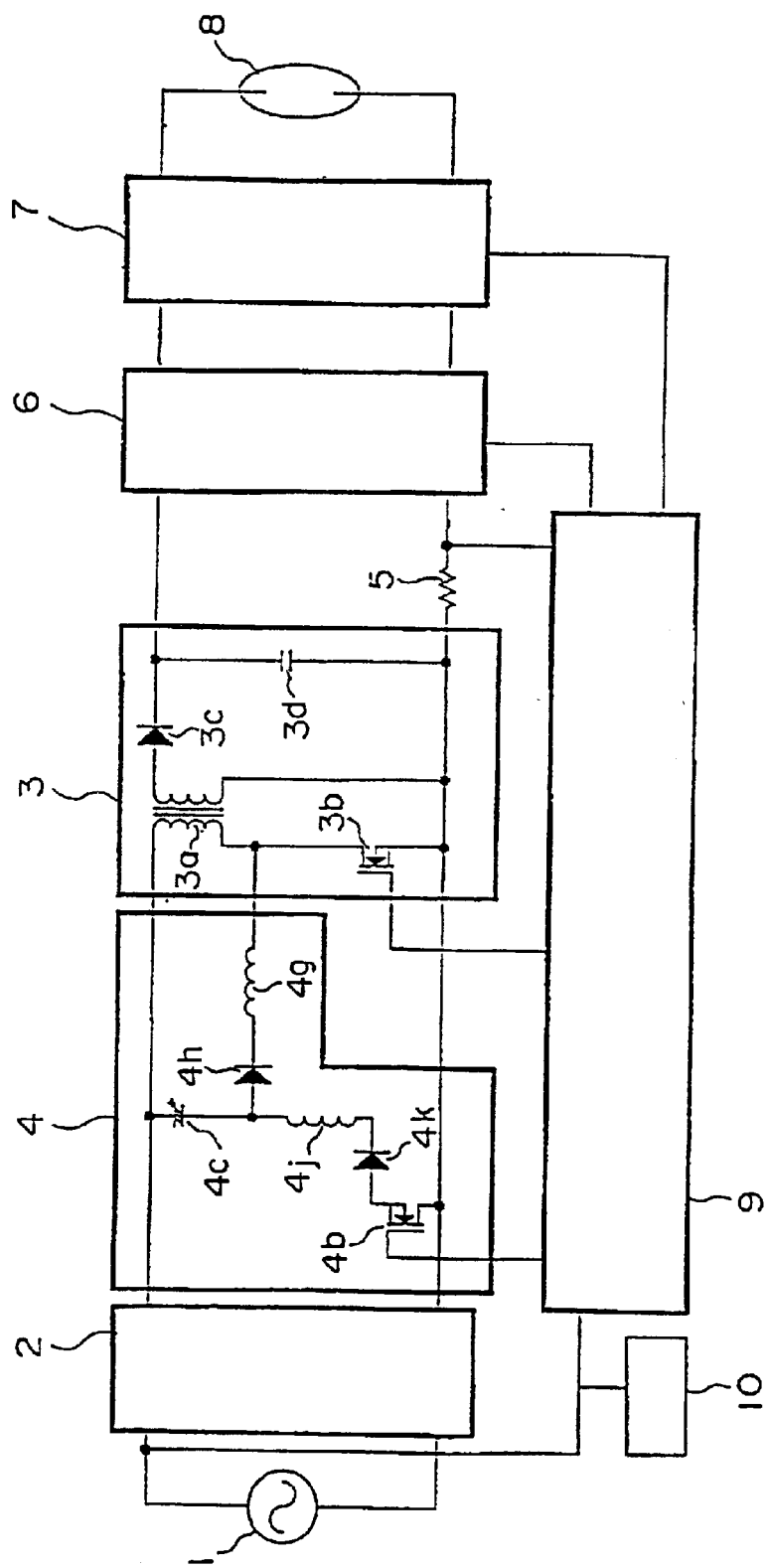
FIG. 3 is a block diagram illustrating a discharge lamp lighting apparatus according to fifth to seventh embodiments of the present invention.

FIG. 3 is a block diagram illustrating the discharge lamp lighting apparatus according to the fifth embodiment of the invention. Referring to FIG. 3, denoted 1 is the commercial ac power source, 2 diode bridge for the full-wave rectification of the commercial ac power, 3 step-up/step-down converter that raises and lowers the full-wave rectified voltage, and 4 supplemental power circuit composed of a second capacitor 4c, second diode 4h, third diode 4k, first inductance 4g, second inductance 4j, and second switching element 4b. Denoted 8 is a discharge lamp, 5 current detection resistance that detects the current running through the discharge lamp 8, 6 polarity switching circuit that switches the polarity of current running through the discharge lamp 8, 7 starter pulse generating circuit that generates high voltage pulses to start up the discharge lamp 8, and 9 control circuit.

The second capacitor 4c, second diode 4h and first inductance 4g constitute charging means for electric charge via the switching element 3b in the step-up/step-down converter 3, while the third diode 4k, second inductance 4j and second switching element 4b constitute discharging means.

Next, the operation is described with reference to FIG. 3. In the supplemental power circuit 4, the current flows to the primary side of the transformer 3a when the first switching element 3b in the step-up/step-down converter 3 is turned on and then the transformer stores energy. At the same time, a current flows in the second capacitor 4c, second diode 4h and first inductance 4g, and then the second capacitor 4c stores electric charge.

The control circuit 9 detects the zero-cross of the commercial ac power source voltage and measures the interval of the commercial ac power source voltage. Based on the calculated period, the control circuit 9 switches the second switching element 4b at a high frequency for a predetermined period before and after the zero-cross in order to supply the energy stored in the second capacitor 4c to the primary side of the transformer 3a via the second switching element 4b, third diode 4k and second inductance 4j.

The other operations of this circuit are the same as those described in the first embodiment shown in FIG. 1.

Figure 4:
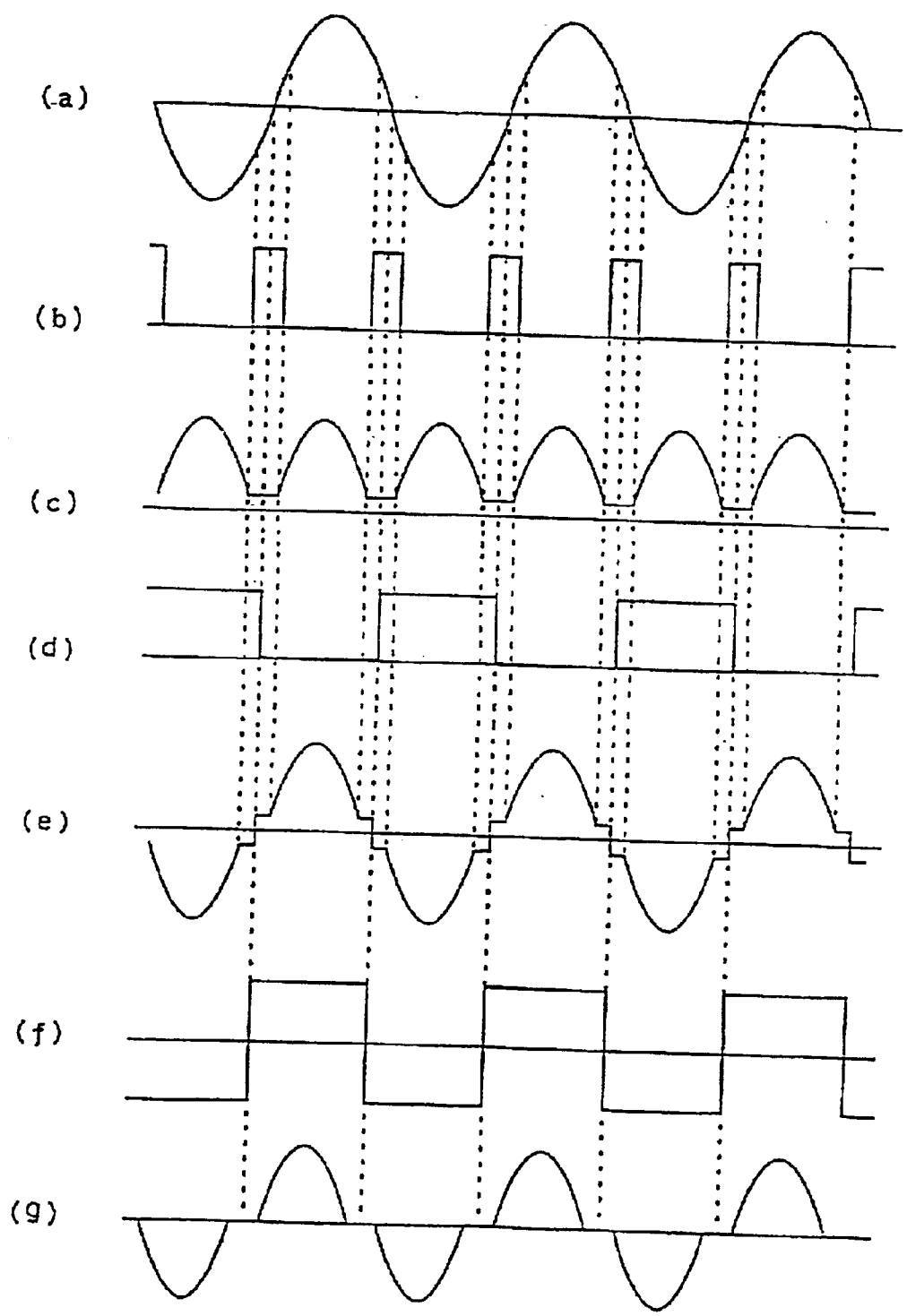
FIG. 4 is a diagram illustrating operation waves in the fifth embodiment.

The operation of the supplemental power circuit 4 is further described, referring to FIG. 4.

FIG. 4(a) illustrates the voltage waveform of the commercial ac power source, FIG. 4(b) the waveform of the second switching element 4b during its operation, FIG. 4(c) the target current waveform, FIG. 4(d) the waveform of polarity switching, FIG. 4(e) the waveform of current running through the discharge lamp 8, FIG. 4(f) the waveform of the discharge lamp voltage and FIG. 4(g) the waveform of the input current provided to the discharge lamp lighting apparatus.

First, the voltage of the waveform shown in FIG. 4(a) is supplied from the commercial ac power source and the second switching device 4b conducts switching operation at a high frequency during the predetermined period before and after the zero-cross, as shown in FIG. 4(b). On the other hand, the calculation means of the control means 9 calculates the target current shown in FIG. 4(c). The target current is a direct current during the time the second switching element 4b is operating at a high frequency, while the target current is an arched current having peaks at 90° and 270° of the waveform of the commercial ac power source voltage.

The control circuit 9 reads the current running through the current detection resistance 5 and controls the step-up/step-down converter 3 and supplemental power circuit 4 with feedback so that the detected current becomes equal to the target current calculated by the calculation means of the control circuit 9. The output of the step-up/step-down converter 3 and the supplemental power circuit 4 is converted by the polarity switching wave provided by the polarity switching circuit 6, as shown in FIG. 4(d), synchronizing with the voltage zero-cross of the commercial ac power source 1. This output running through the discharge lamp 8 presents the waveform shown in FIG. 4(e).

The duration time when the discharge lamp current is near zero becomes short because the supplemental power circuit 4 supplies electric power to the discharge lamp 8 before and after zero-cross, as shown in FIG. 4(e). As a result, the discharge lamp voltage presents the voltage waveform shown in FIG. 4(f) that does not cause restriking voltage.

During the operation of the supplemental power circuit 4, the dc voltage source of the second capacitor 4c supplies power to the discharge lamp 8 via the step-up/step-down converter 3. Then the input current flowing from the commercial ac power source to the lighting apparatus becomes close to zero as shown in FIG. 4(g). On the other hand, during the other periods, the target current is an arch current having peaks at 90° and 270° of the waveform of the commercial ac power source voltage. Then the input current also presents a sinusoidal wave similar to the waveform of the commercial ac power source voltage having peaks at 90° and 270° in phase. As is the case with the first embodiment, if the arched type target current has a waveform of squared sinusoid, the input current becomes further close to the sinusoidal wave.

As described above, the supplemental power circuit 4 supplies electric power to the discharge lamp 8 during the period before and after zero-cross of the commercial ac power source voltage and thus the duration of time when the current running through the discharge lamp 8 is zero becomes short. Therefore, no restriking voltage of the discharge lamp 8 appears, turn-off of the lamp can be prevented, and decrease of the illumination efficiency can be prevented.

In the period before and after zero-cross of the commercial ac power source voltage, the discharge lamp 8 is powered via the step-up/step-down converter 3 by the direct-current voltage source of the capacitor in the supplemental power circuit 4 when the supplemental power circuit 4 is operating. Therefore, the current flowing from the commercial ac power source 1 to the discharge lamp 8 becomes zero. However, when the supplemental power circuit 4 is not working, since the target current presents an arched waveform having peaks at 90° and 270° of the commercial ac power source voltage, so that the input current presents an arched waveform having peaks at 90° and 270° of the waveform of the commercial ac power source voltage. As a result, the input current presents a sinusoidal waveform similar to that of the commercial ac power source voltage. Then it becomes possible to raise power factor without adding the step-up converter 3 for the improvement of power factor and to provide inexpensive discharge lamp lighting systems.

Embodiment 6

Since the block diagram of the discharge lamp lighting apparatus according to the sixth embodiment of the invention is the same as that of the fifth embodiment shown in FIG. 3, the sixth embodiment is explained with reference to FIG. 3.

The second switching element 4b in the supplemental power circuit 4 is switched at a high frequency over whole cycles of the commercial ac power source, until the starter pulse generating circuit 7 applies high voltage pulses to the discharge lamp 8 for lighting up and the current running through the discharge lamp 8 is detected by the current detection resistance 5.

When the discharge lamp starts dielectric breakdown triggered by high voltage pulses and initiates discharge, the supplemental power circuit also supplies current to the discharge lamp. Therefore, a sufficient amount of current is provided during the transition from the unstable discharge state immediately after the dielectric breakdown to stable light-up, and then a smooth start-up is realized.

Embodiment 7

Since the block diagram of the discharge lamp lighting apparatus according to the seventh embodiment of the invention is the same as that of the fifth embodiment shown in FIG. 3, the seventh embodiment is explained with FIG. 3.

The voltage detection means installed in the control circuit 9 detects the commercial ac power source voltage. If a decrease from the normal voltage is detected in the commercial ac power source voltage, the second switching element 4b in the supplemental power circuit 4 is switched at a high frequency even when it is out of the predetermined period before and after the zero-cross of the commercial ac power source voltage.

Then even if a problem arises in the commercial ac power source, the probability of turn-off of the lamp can be decreased.

Embodiment 8

Since the block diagram of the discharge lamp lighting apparatus according to the eighth embodiment of the invention is the same as that of the first embodiment shown in FIG. 1, the eighth embodiment is explained with reference to FIG. 1.

In the first embodiment, the second switching element 4b in the supplemental power circuit 4 is switched at a high frequency during the predetermined period before and after the zero-cross of the commercial ac power source voltage, and during this period the energy stored in the second capacitor 4c is provided to the discharge lamp 8. In the eight embodiment, the second switching element 4b in the supplemental power circuit 4 is switched, at the same frequency as the operation frequency of the first switching element 3b in the step-up/step-down converter 3, so as to have an On-time shorter by a predetermined time than that of the switching element 3b, over the whole cycle of the commercial ac power source voltage. Then the energy stored in the second capacitor 4c is supplied to the discharge lamp 8.

Figure 5:
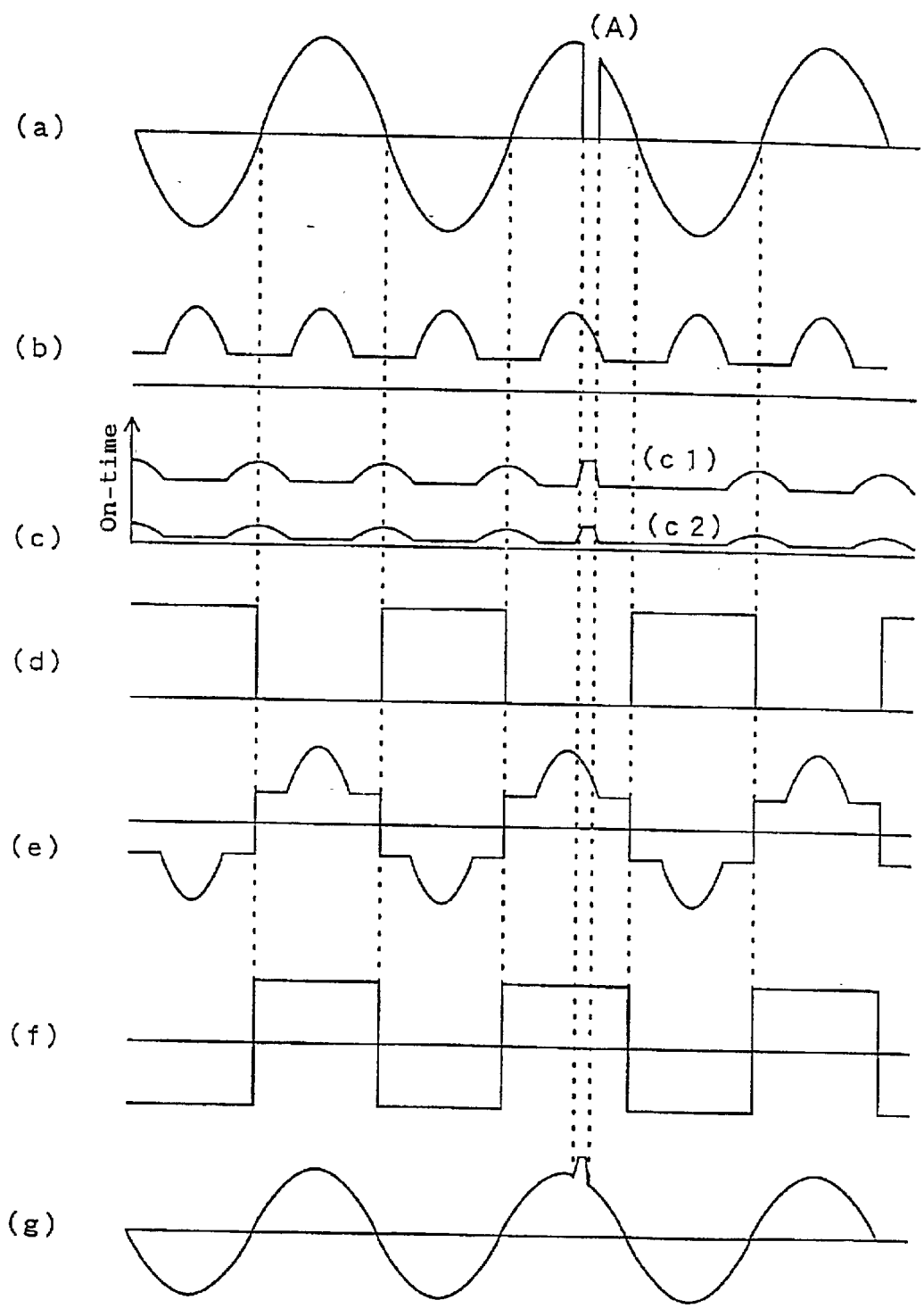
FIG. 5 is a diagram illustrating operation waves in the eighth embodiment.
Figure 6:
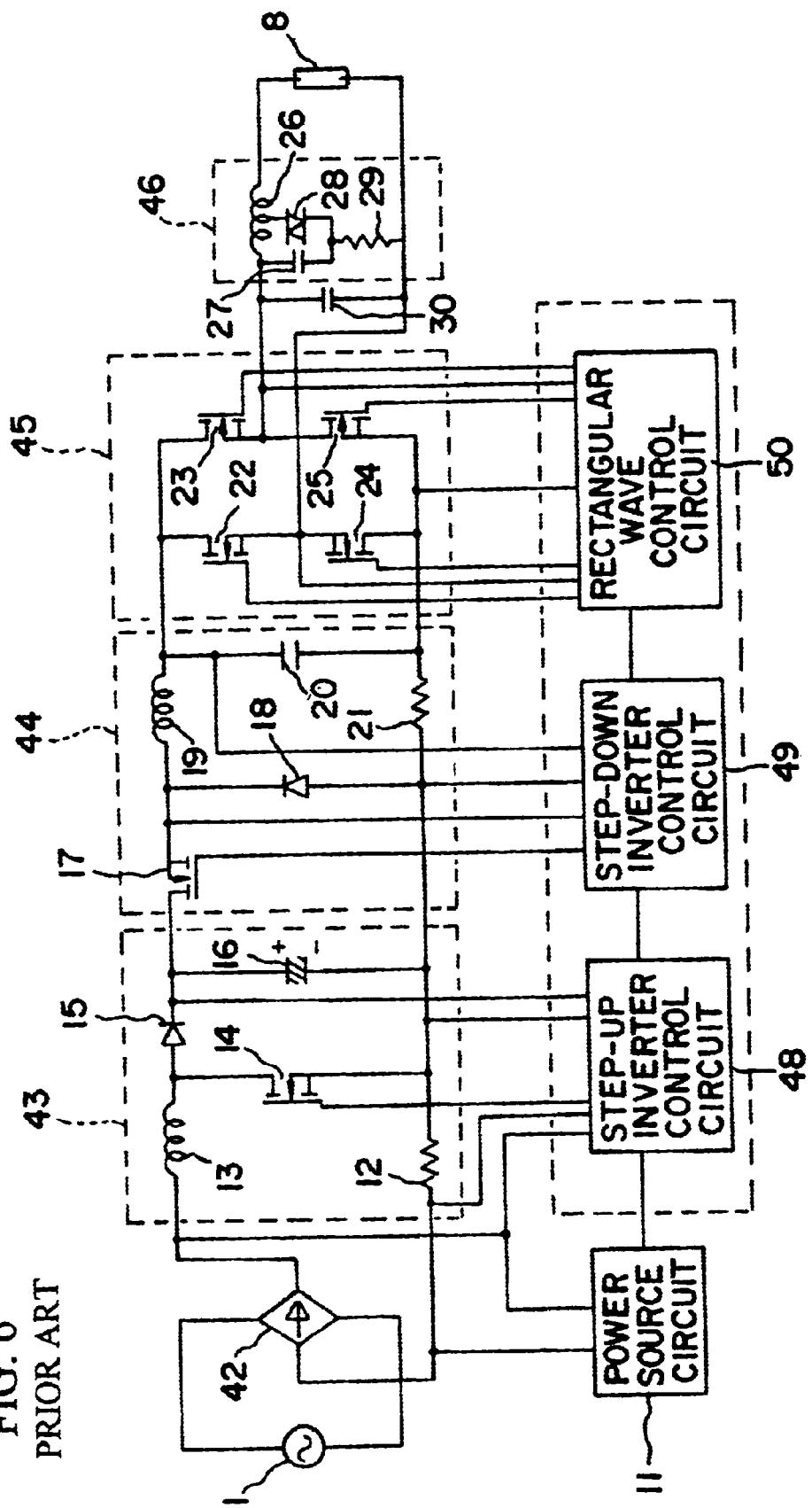
FIG. 6 is a block diagram illustrating a conventional discharge lamp lighting apparatus.
Figure 7:
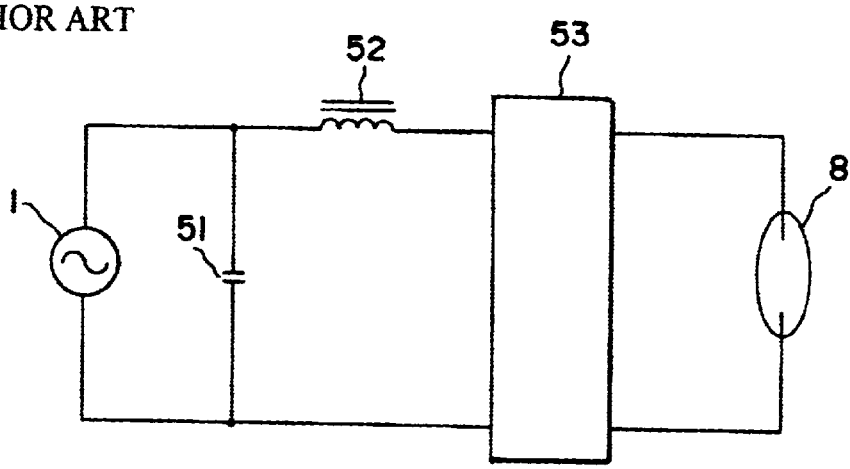
FIG. 7 is another block diagram illustrating a conventional discharge lamp lighting apparatus.
Figure 8:
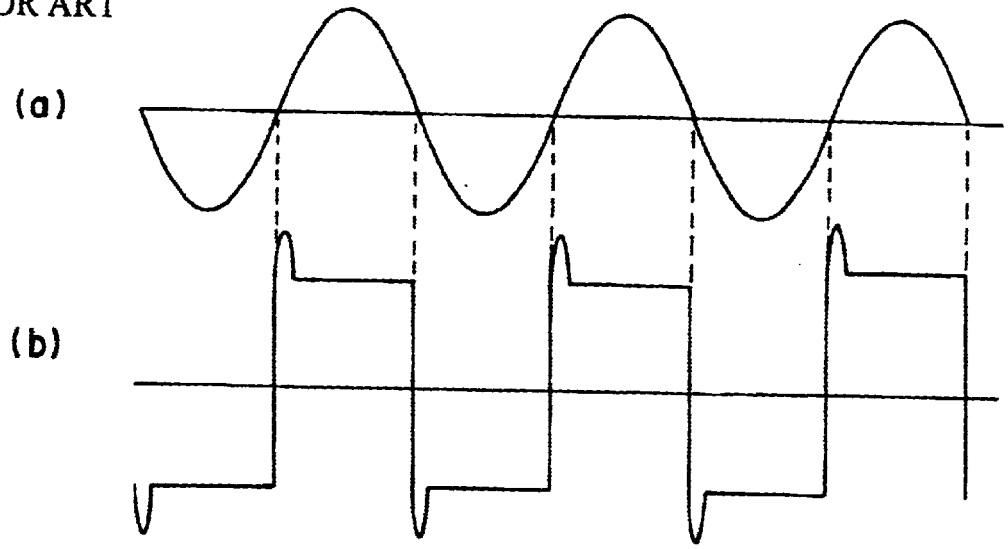
FIG. 8 is a diagram illustrating operation waves of a conventional discharge lamp lighting apparatus.

The operation of the supplemental power circuit 4 is described, referring to FIG. 5 that illustrates the operation waveforms.

FIG. 5(a) illustrates the voltage waveform of the commercial ac power source, FIG. 5(b) the target current waveform, FIG. 5(c) the waveforms of the switching elements 3b and 4b during their On-times, namely FIG. 5(c1) the waveform of the switching element 3b and FIG. 5(c2) the waveform of the switching element 4b. FIG. 5(d) illustrates the waveform of polarity switching, FIG. 5(e) the waveform of current running through the discharge lamp 8, FIG. 5(f) the waveform of the discharge lamp voltage, and FIG. 5(g) the waveform of the input current to the discharge lamp lighting apparatus.

First, the voltage of the waveform shown in FIG. 5(a) is supplied from the commercial ac power source and the calculation means of the control means 9 calculates the target current shown in FIG. 5(b). The target current is a direct current during the period before and after the zero-cross of the commercial ac power source voltage, while the target current is an arch current having peaks at 90° and 270° of the waveform of the commercial ac power source voltage.

The control circuit 9 reads the current running through the current detection resistance 5 and controls the step-up/step-down converter 3 with feedback so that the detected current becomes equal to the target current calculated by the calculation means of the control circuit 9. Since it is difficult to take out power during the period around the zero-cross of the commercial ac power source voltage because of the low voltage, the control circuit 9 increase the On-time of the switching element 3b as shown in FIG. 5(c1) to take out necessary power. At this time, since the On-time of the switching element 4b is also increased as shown in FIG. 5(c2), supplemental power is supplied to the discharge lamp 8 via the second capacitor 4c, third diode 4f, inductance 4e and polarity switching circuit 6 to make up for the shortage of power supply from the commercial ac power source. Based on the polarity switching waveform shown in FIG. 5(d), the polarity switching circuit 6 switches the current running through the discharge lamp 8 as shown in FIG. 5(e).

A large amount of electric power is required around the zero-cross of the commercial ac power source voltage in order to suppress the restriking voltage that appears in the discharge lamp 8. At this time, since the second capacitor 4c supplies power to the discharge lamp 8, the current flowing from the commercial ac power source to the discharge lamp lighting apparatus decreases and then the input current waveforms around the zero-cross of the commercial ac power source voltage are similar to those of the commercial ac power source voltage. During the period of time when the target current is an arched current having peaks at 90° and 270° of the waveform of the commercial ac power source voltage, the restriking voltage does not appear, and then the input current becomes proportional to the discharge lamp current. Namely, if the discharge lamp current has an arched waveform having peaks at 90° and 270° in phase, the input current also shows an arched type waveform. Therefore, as shown in FIG. 5(g) that illustrates the input current waveform, the input current has an arched waveform similar to the waveform of the commercial ac power source voltage.

Referring now to an area (A) in FIG. 5(a), if the supply of the commercial ac power source voltage stops momentarily because of an accident, the control circuit 9 increases the On-time of the switching element 3b as shown FIG. 5(c1), trying to take out electric power. Then the On-time of the switching element 4b is also increased as shown in FIG. 5(c2), and the second capacitor 4c provides electric power to the discharge lamp 8. As a result, the turn-off of the discharge lamp 8 is prevented.

What is claimed is:

1. A discharge lamp lighting apparatus, for controlling electric power supplied to a discharge lamp by a step-up/step-down converter comprising a transformer, a first switching element serially connected to the transformer on a side of a commercial ac power source, and a first diode and a first capacitor connected to the transformer on a load side, the discharge lamp lighting apparatus comprising:

zero-cross detection means for detecting zero-cross of voltage of said commercial ac power source;

a supplemental power circuit comprising a second diode connected to a junction between said transformer and said first switching element, a second capacitor for charging energy stored in a coil of said transformer on a side of said commercial ac power source via said second diode, and a second switching element, a third diode and an inductance through which the energy charged in the second capacitor is supplied to said discharge lamp; and a control circuit that calculates a voltage cycle of said commercial ac power source based on an output from said zero-cross detection means and then operates said second switching element in said supplemental power circuit at a high frequency during a predetermined period of time around the zero-cross.

2. The discharge lamp lighting apparatus according to claim 1, further comprising current detection means for detecting current running through said discharge lamp; wherein said control circuit has calculation means for calculating a target current to be provided to said discharge lamp, said calculation means provides a constant target current during the period of time when the second switching element in said supplemental power circuit is operated at a high frequency and another target current of an arched waveform having peaks at around 90° and 270° of voltage of said commercial ac power source during the period of time when said second switching element is not operated, and said control circuit controls the current running through said discharge lamp detected by said current detection means so as to make it equal to said calculated target current.

3. The discharge lamp lighting apparatus according to claim 2, wherein said target current of an arched waveform having peaks at around 90° and 270° of said commercial ac power source voltage during the period of time when the second switching element of said supplemental power circuit is not operated has a waveform of squared sinusoid.

4. The discharge lamp lighting apparatus according to claim 1, wherein said control circuit controls said supplemental power circuit to operate only during the period between 45° ahead and 45° behind the zero-cross of said commercial ac power source voltage or shorter, controls said constant, target current in the target current so as to make it equal to or less than half the peak value of said target current, and operates the second switching element in said supplemental power circuit at the same frequency and for the same or a shorter On-time as that for the first switching element in said step-up/step-down converter.

5. A discharge lamp lighting apparatus, for controlling electric power supplied to a discharge lamp by a step-up/step-down converter comprising a transformer, a first switching element serially connected to the transformer on a side of a commercial ac power source, and a first diode and a first capacitor connected to the transformer on a load side, the discharge lamp lighting apparatus comprising:
  zero-cross detection means for detecting zero-cross of voltage of said commercial ac power source;
  a supplemental power circuit comprising a second capacitor installed on a side of said commercial ac power source which is charged via a second diode, a first inductance and the first switching element in the step-up/step-down converter, and supplies energy stored in the second capacitor to said discharge lamp via a third diode, second inductance and second switching element; and
  a control circuit that calculates a voltage cycle of said commercial ac power source based on an output from said zero-cross detection means and then operates said second switching element in said supplemental power circuit at a high frequency during a predetermined period of time around the zero-cross.

6. The discharge lamp lighting apparatus according to claim 1, further comprising current detection means for detecting the current running through said discharge lamp; wherein said control circuit switches the second switching element in said supplemental power circuit at a high frequency over the whole cycles of said commercial ac power source voltage until said current detection means detects current running through said discharge lamp after lighting up of said discharge lamp.

7. The discharge lamp lighting apparatus according to claim 1, further comprising voltage detection means for detecting voltage of said commercial ac power source; wherein said second switching element in said supplemental power circuit is switched at a high frequency when said commercial ac power source voltage is determined to be lower than a normal voltage.

8. A discharge lamp lighting apparatus, for controlling electric power supplied to a discharge lamp by a step-up/step-down converter comprising a transformer, a first switching element serially connected to said transformer on a side of a commercial ac power source, and a first diode and a first capacitor connected to the transformer on a load side, the discharge lamp lighting apparatus comprising:
  zero-cross detection means for detecting zero-cross of voltage of said commercial ac power source;
  a supplemental power circuit comprising a second diode connected to a junction between said transformer and said first switching element, a second capacitor for charging energy stored in a coil of said transformer on a side of said commercial ac power source via said second diode, and a second switching element, a third diode and an inductance through which the energy stored in the second capacitor is supplied to said discharge lamp; and
  a control circuit that operates said second switching element in said supplemental power circuit at the same high frequency as that for the first switching element in said step-up/step-down converter, with an On-time shorter by a predetermined time than the On-time of said first switching element, over whole cycles of said commercial ac power source.

9. The discharge lamp lighting apparatus according to claim 8, further comprising current detection means for detecting current running through said discharge lamp; wherein said control circuit has calculation means for calculating a target current to be provided to said discharge lamp to make a target current of an arched waveform having peaks at around 90° and 270° of said commercial ac power source voltage and almost flat portions around zero-cross, and controls current running through the discharge lamp, which is detected by said current detection means, so as to make it equal to said calculated target current.

10. A lamp apparatus having the discharge lamp lighting apparatus according to claim 1.

11. The discharge lamp lighting apparatus according to claim 5, further comprising current detection means for detecting the current running through said discharge lamp; wherein said control circuit switches the second switching element in said supplemental power circuit at a high frequency over the whole cycles of said commercial ac power source voltage until said current detection means detects current running through said discharge lamp after lighting up of said discharge lamp.

12. The discharge lamp lighting apparatus according to claim 5, further comprising voltage detection means for detecting voltage of said commercial ac power source; wherein said second switching element in said supplemental power circuit is switched at a high frequency when said commercial ac power source voltage is determined to be lower than a normal voltage.

13. A lamp apparatus having the discharge lamp lighting apparatus according to claim 2.

14. A lamp apparatus having the discharge lamp lighting apparatus according to claim 3.

15. A lamp apparatus having the discharge lamp lighting apparatus according to claim 4.

16. A lamp apparatus having the discharge lamp lighting apparatus according to claim 5.

17. A lamp apparatus having the discharge lamp lighting apparatus according to claim 6.

18. A lamp apparatus having the discharge lamp lighting apparatus according to claim 7.

19. A lamp apparatus having the discharge lamp lighting apparatus according to claim 8.

20. A lamp apparatus having the discharge lamp lighting apparatus according to claim 9.

* * * * *